United States Patent
Matsuda et al.

(10) Patent No.: US 9,265,308 B2
(45) Date of Patent: Feb. 23, 2016

(54) SLIDE FASTENER

(75) Inventors: Yasuhiko Matsuda, Toyama (JP); Yuichi Yamashita, Toyama (JP)

(73) Assignee: YKK Corporation (JP)

( * ) Notice: Subject to any disclaimer, the term of this patent is extended or adjusted under 35 U.S.C. 154(b) by 199 days.

(21) Appl. No.: 13/824,212

(22) PCT Filed: Sep. 17, 2010

(86) PCT No.: PCT/JP2010/066190
§ 371 (c)(1),
(2), (4) Date: Mar. 15, 2013

(87) PCT Pub. No.: WO2012/035653
PCT Pub. Date: Mar. 22, 2012

(65) Prior Publication Data
US 2013/0180087 A1  Jul. 18, 2013

(51) Int. Cl.
A44B 19/32 (2006.01)
A44B 19/26 (2006.01)
A44B 19/04 (2006.01)
A44B 19/06 (2006.01)
A44B 19/42 (2006.01)
B29D 5/02 (2006.01)
A44B 19/08 (2006.01)

(52) U.S. Cl.
CPC .......... *A44B 19/26* (2013.01); *A44B 19/04* (2013.01); *A44B 19/06* (2013.01); *A44B 19/08* (2013.01); *A44B 19/32* (2013.01); *A44B 19/42* (2013.01); *B29D 5/02* (2013.01); *Y10T 24/2554* (2015.01); *Y10T 29/49785* (2015.01)

(58) Field of Classification Search
USPC .................................................. 24/389, 411
See application file for complete search history.

(56) References Cited

U.S. PATENT DOCUMENTS

| 4,502,190 | A  | * | 3/1985  | Inamura ................ 24/389 |
| 4,765,038 | A  |   | 8/1988  | Kasai |
| 6,343,408 | B1 | * | 2/2002  | Neugebauer ........... 24/389 |
| 7,181,810 | B2 | * | 2/2007  | Fernando .............. 24/389 |
| 7,441,312 | B2 | * | 10/2008 | Bernasconi ........... 24/389 |
| 7,870,649 | B2 | * | 1/2011  | Mikuma et al. ........ 24/413 |

(Continued)

FOREIGN PATENT DOCUMENTS

| JP | 175714/1983 | 11/1983 |
| JP | 60-20815 U  | 2/1985  |
| JP | 63-13687 Y2 | 4/1988  |

(Continued)

OTHER PUBLICATIONS

International Search Report, PCT Application No. PCT/JP2010/066190, mailed Dec. 14, 2010.

*Primary Examiner* — Abigail Morrell
(74) *Attorney, Agent, or Firm* — Kilpatrick Townsend & Stockton LLP

(57) ABSTRACT

Provided is a slide fastener that has a flexible fastener tape, exhibits liquid-tightness, and can prevent a gap from being formed in a coupling portion, and a method of producing the slide fastener. An overlay material is formed on a front surface of a fastener tape so that the overlay material formed on a surface of a core member extends beyond a centerline in a front-rear thickness direction of a tape member. When a pair of fastener element rows engages with each other, a tip of an intermeshing head of a fastener element presses the overlay material formed on the opposite core members.

1 Claim, 12 Drawing Sheets

(56) References Cited

U.S. PATENT DOCUMENTS

2005/0217086 A1 10/2005 Kusayama et al.
2007/0137006 A1 6/2007 Mikuma et al.
2007/0169320 A1 7/2007 Kusayama et al.

FOREIGN PATENT DOCUMENTS

| JP | 2005-237577 A | 9/2005 |
| JP | 2007-167220 A | 7/2007 |
| JP | 2008-194066 A | 8/2008 |

* cited by examiner

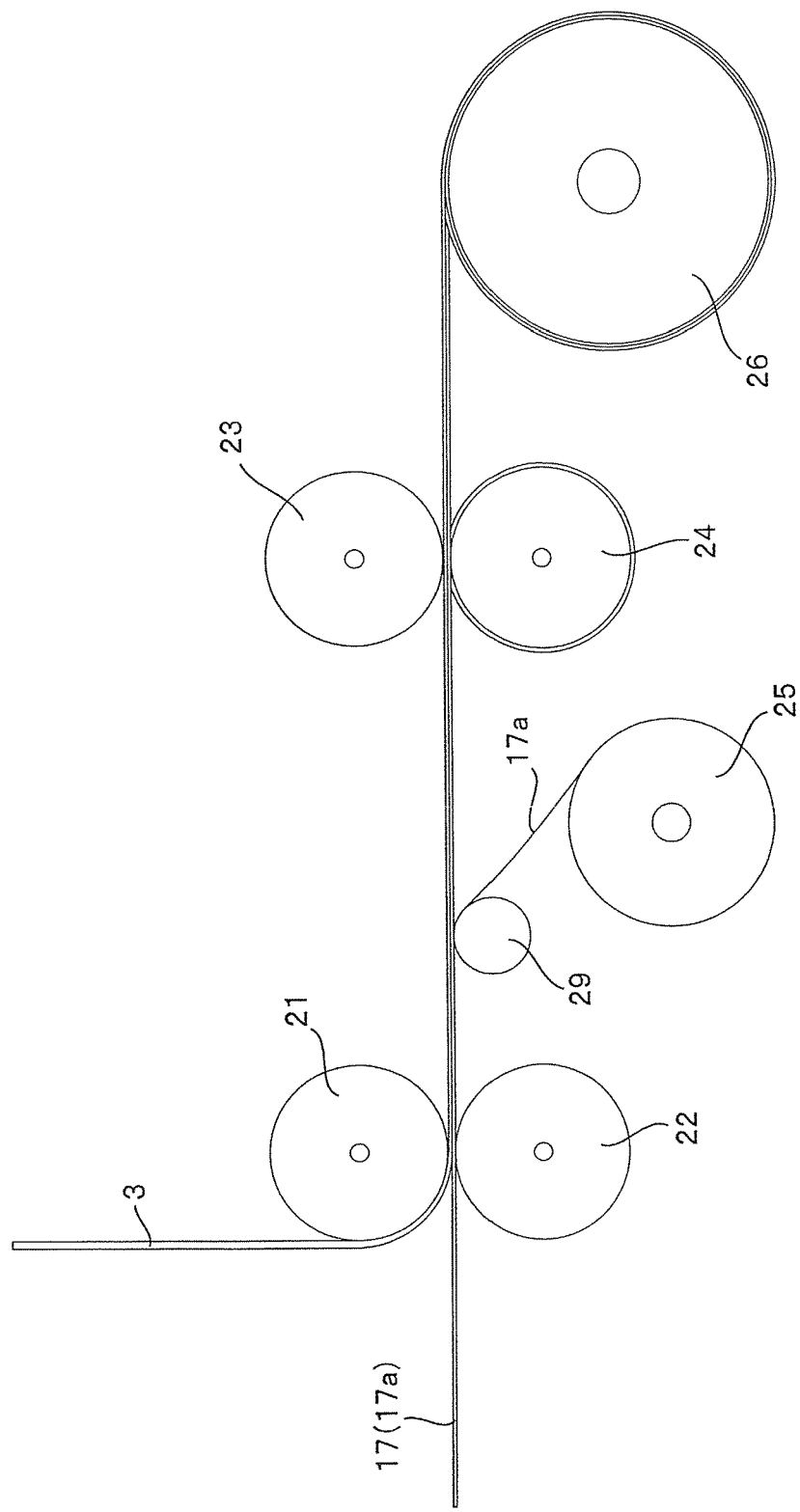

SLIDE FASTENER

This application is a national stage application of PCT/JP2010/066190 which is incorporated herein by reference.

TECHNICAL FIELD

The invention relates to a slide fastener used for openings of clothes, cases, bags, and the like which require water-repellent properties and oil-repellent properties and a method of producing the slide fastener.

BACKGROUND ART

Conventionally, as one demand for a slide fastener that is opened and closed according to sliding of a slider, a configuration that prevents water or the like from entering through the slide fastener is demanded. As a configuration that prevents water or the like from entering through the slide fastener, there have been proposed a liquid-tight slide fastener (see Patent Document 1) in which an overlay material made from a synthetic resin is provided on one surface side of a fastener tape, and a water-repellent agent or an oil-repellent agent is attached to a core thread, a slide fastener (see Patent Document 2) in which the entire front and rear surfaces of a fastener tape are coated with an overlay material made from a synthetic resin, and the like.

The liquid-tight slide fastener disclosed in Patent Document 1 has a configuration as illustrated in FIG. 15. The liquid-tight slide fastener disclosed in Patent Document 1 is illustrated in FIG. 15 as a first conventional example of the invention, in which a configuration of a part of the liquid-tight slide fastener is depicted as a perspective view. As illustrated in FIG. 15, a liquid-tight slide fastener 50 has a configuration in which a coil-like coupling element row 53, through which a core thread 52 is inserted, is sewed along opposing side edges of a pair of left and right fastener tapes 51. Moreover, a liquid-tight layer 54 is formed on one surface of each of the pair of left and right fastener tapes 51.

Further, a water-repellent agent or an oil-repellent agent is attached to the core thread 52.

By configuring the liquid-tight slide fastener 50 in this manner, even when moisture or oil enter into a space portion of the coupling element row 53 from a coupling portion of the liquid-tight slide fastener 50, the entered moisture or oil can be repelled by the water-repellent agent or the oil-repellent agent attached to the core thread 52. Moreover, it is possible to prevent moisture or oil from penetrating further toward the inner side from the space portion of the coupling element row 53.

The slide fastener disclosed in Patent Document 2 has a configuration as illustrated in FIG. 16. The slide fastener disclosed in Patent Document 2 is illustrated in FIG. 16 as a second conventional example of the invention, in which a configuration of a part of one fastener stringer is illustrated as a perspective view. As illustrated in FIG. 16, a fastener stringer 60 includes a fastener tape 61 and an element row 64 that includes a plurality of element teeth 65 provided at an equal interval along a longitudinal direction of the fastener tape 61.

An overlay layer 66 made from an elastomer is formed on both front and rear surfaces of a core tape 62 and a projecting piece 63 that form the fastener tape 61, and an extension portion 67 made from the same material as the overlay layer 66 protrudes from the projecting piece 63. The thickness of the extension portion 67 is approximately the same as the thickness of the core tape 62 on which the overlay layer 66 is formed. Moreover, a flange 68 protrudes from the extension portion 67, and the flange 68 is made from the same material as the overlay layer 66 and has a thickness smaller than the thickness of the extension portion 67.

When a pair of element rows 64 engages with each other, the flanges 68 of the opposing fastener stringers 60 can be pressed and bent by intermeshing heads 65a of the element teeth 65. Moreover, when the flange 68 is bent, the whole circumference of the intermeshing head 65a is blocked by the flange 68.

As a result, a satisfactory liquid-tight state is created in the engaging portions of the engaged element teeth 65.

PRIOR ART DOCUMENT

Patent Document

Patent Document 1: JP 2008-194066 A
Patent Document 2: JP 63-13687 Y2

DISCLOSURE OF THE INVENTION

Problem to be Solved by the Invention

In the configuration of the liquid-tight slide fastener disclosed in Patent Document 1, it is necessary to provide the liquid-tight layer 54 made from a synthetic resin on one surface side of the fastener tape 51 and to attach a water-repellent agent or an oil-repellent agent to the core thread 52.

Moreover, since the liquid-tight slide fastener 50 is configured such that the opposing side edges of the liquid-tight layers 54 come into contact with each other, when a very large lateral pulling force is applied to the liquid-tight slide fastener 50, a gap W1 at the coupling portion widens.

In the liquid-tight slide fastener 50 disclosed in Patent Document 1, even when the gap W1 at the coupling portion widens, the core thread 52 to which a water-repellent agent or an oil-repellent agent is attached can prevent moisture or oil from entering further into the liquid-tight slide fastener 50. However, a configuration that prevents the gap W1 at the coupling portion from widening is not provided.

In the slide fastener disclosed in Patent Document 2, when the fastener is closed by engaging the element rows 64, the tip of the intermeshing head 65a of each of the element rows 64 makes contact with the overlay layer 66 of the fastener tape 61, whereby water-stopping properties are obtained.

Moreover, the overlay layer 66 and the flange 68 are formed in such a shape as to extend while covering the core tape 62 and the projecting piece 63, and the flange 68 of the overlay layer 66 makes contact with the intermeshing head 65a. Thus, it is necessary to configure the flange 68 with which the intermeshing head 65a makes contact so as to protrude from the extension portion 67. Further, since the overlay layer 66 is formed on both the front and rear surfaces of the core tape 62 and the projecting piece 63, the overlay layer 66 is formed on both surfaces of the fastener tape 61, which causes a problem in the flexibility of the fastener tape 61.

Thus, an object of the invention is to provide a slide fastener in which a fastener tape has flexibility, an overlay material provides liquid-stopping properties, and no gap is formed at a coupling portion and to provide a method of producing the slide fastener.

Means for Solving the Problems

In order to attain the object, a slide fastener according to the invention includes: a pair of left and right fastener tapes, each of which includes a tape member and in which a core member that is larger than the tape member is formed along a side edge of the tape member; a fastener element row in which a plurality of fastener elements is arranged at an equal interval along each of the core members; and a slider that is attached so as to be slidable along the pair of left and right fastener element rows so that the fastener elements disposed to face each other are engaged and disengaged, being characterized in that:

the fastener element includes a intermeshing head and a body portion that extends from the intermeshing head, and when the pair of fastener element rows disposed to face each other engages with each other according to sliding of the slider, a tip of the intermeshing head comes into contact with the side edges of the opposing fastener tapes; and an overlay material that has liquid-tightness and is elastically deformable is formed on an entire surface of one of front and rear surfaces of each of the fastener tapes closer to one surface side of the tape member and a surface of the core member continuous to the one surface side of the tape member, and the overlay material formed on the core member extends toward another surface side beyond a centerline in a front-rear thickness direction of the tape member.

The slide fastener of the invention is mainly characterized in that an end portion of the overlay material formed on the core member is positioned closer to the centerline than an apex on the other surface side of the core member.

A method of producing a slide fastener according to the invention including: a first step of forming an overlay material that has liquid-tightness and is elastically deformable on one surface side of front and rear surfaces of a pair of fastener tapes in which respective core members are separated so as to face each other, so as to extend between the pair of fastener tapes; a second step of inserting projecting portions between the core members from the one surface side of the pair of fastener tapes and cutting the overlay material between the core members; and a third step of injecting and molding a fastener element on each of the core members of the fastener tapes that are divided by cutting of the overlay material.

The method of producing the slide fastener according to the invention is characterized in that the first step includes: a step of supplying the pair of left and right fastener tapes each including the core member in a state where the core members are separated so as to face each other; and a step of forming the overlay material on one surface side of a front surface and a rear surface of the pair of fastener tapes so as to extend between the pair of supplied fastener tapes.

The method of producing the slide fastener according to the invention is characterized in that the first step involves preparing a first roller in which a first recess configured to be able to receive the pair of separated core members is formed and a second roller that is disposed on the one surface side of the pair of fastener tapes so as to face the first roller and has a first flat surface; the first step involves allowing the pair of core members received in the first recess to be tilted in a direction away from each other within the first recess due to the first flat surface and supplying the overlay material between the second roller and the one surface side of the pair of fastener tapes; and the second step involves preparing a fourth roller in which a second recess configured to be able to receive the pair of separated core members and the overlay material is formed and which includes a projecting portion that protrudes outward from the second recess and a third roller that is disposed on the other surface side of the pair of fastener tapes so as to face the fourth roller and has a second flat surface; and the second step involves allowing the pair of core members received within the second recess to be tilted in a direction away from each other within the second recess due to the second flat surface and cutting the overlay material between the pair of core members at the projecting portion of the fourth roller.

Effect of the Invention

In the slide fastener according to the invention, the overlay material that has liquid-tightness and is elastically deformable is formed on the one surface side of the fastener tape, and the core member is formed so as to extend up to the other surface side of the fastener tape beyond the centerline in the front-rear thickness direction of the tape member.

Due to such a configuration, in a state where the fastener elements engage with each other and the fastener is closed, the tip of the intermeshing head of the fastener element can be brought into contact with the overlay material of the core member. Moreover, the overlay material of the core member with which the tip of the intermeshing head comes into contact is compressively deformed by the tip of the intermeshing head. As a result, even when a very large lateral pulling force is applied to the slide fastener in a state where the fastener is closed so that a gap starts being formed at the coupling portion, the overlay material of the core member that is being in contact with the tip of the intermeshing head can maintain the contact state with the tip of the intermeshing head while decreasing a compressive deformation amount. Moreover, since the fastener elements are engaged with each other in a state where no gap is formed between the engaged fastener elements, it is possible to prevent a gap from being formed in the slide fastener.

In this manner, since it is possible to prevent the occurrence of a gap even at the coupling portion, it is possible to provide the slide fastener having liquid-tightness function.

Further, since the overlay material is formed on the one surface side of the fastener tape, it is possible to improve flexibility of the slide fastener as compared to when the overlay material is formed on both surfaces of the fastener tape.

The end portion of the overlay material formed on the core member can be located closer to the centerline in the front-rear thickness direction of the tape member than the apex on the other surface side of the core member.

Due to such a configuration, even when the slide fastener is bent, and a very large lateral pulling force is applied to the slide fastener, the overlay material of the core member that is in contact with the tip of the intermeshing head can be maintained in the compressively deformed state. Further, since it is possible to decrease the region of the core member on which the overlay material is formed, it is possible to improve flexibility of the slide fastener.

In the method of producing the slide fastener according to the invention, the first step involves forming the overlay material on the one surface side of the pair of fastener tapes so as to extend between the pair of fastener tapes in a state where the respective core members are separated so as to face each other. Moreover, the second step involves cutting the overlay material formed between the core members using the projecting portions, and the respective fastener tapes in which the overlay material between the core members is cut form independent fastener tapes.

Due to such a configuration, by adjusting a separation gap between the respective core members, the end portion of the overlay material formed on the core member can be located at an optional position that is closer to the other surface side of the core member beyond the centerline in the front-rear thickness direction of the tape member.

Further, since the third step involves injecting the fastener element into each of the core members of the respective fastener tapes, it is possible to prevent the end portion of the overlay material formed on the core member from being torn off from the core member and to allow the end portion to be reliably held by the fastener element. Thus, it is possible to produce a fastener chain continuously.

The first step may be divided into a step of supplying the pair of fastener tapes and a step of forming the overlay material on the fastener tape.

Accordingly, it is possible to perform process control easily.

The first step may be configured to use the first and second rollers, and the second step may be configured to use the third and fourth rollers. By using the first and second rollers and the third and fourth rollers in this manner, it is possible to set a separation gap between the respective core members to a desired gap. Moreover, the position of the end portion of the overlay material formed on the core member after the overlay material is cut can be set to a desired position.

Further, a tilting direction of the pair of core members when the overlay material is formed on the one surface side of the pair of fastener tapes may be opposite to a tilting direction of the pair of core members when the overlay material is cut. Accordingly, the position of the end portion of the overlay material formed on the core member can be set to an optional position that is located closer to the other surface side of the core member beyond the centerline in the front-rear thickness direction of the tape member. Further, it is possible to prevent a portion of the core member from being cut when the overlay material formed on the core member is cut. Moreover, when the overlay material is cut, since the overlay material between the core members is in a state in which it is pulled by the tilted core members, it is possible to cut the overlay material easily and to wind the end portions of the cut overlay material around the core member.

A flat synthetic resin sheet in which a release paper is formed on a surface that makes contact with the second and fourth rollers may be used as the overlay material, for example. The synthetic resin sheet can be attached to the one surface side of the pair of fastener tapes with an adhesive strength of the surface opposite to the surface where the release paper is formed.

Rather than using the synthetic resin sheet, a synthetic resin solution such as a water-repellent agent or an oil-repellent agent may be used as the overlay material. The synthetic resin solution may be coated up to the vicinity of a region beyond the centerline in the front-rear thickness direction of the pair of fastener tapes.

When the synthetic resin solution is coated on the one surface side of the pair of fastener tapes, since the core members may be connected depending on a coating agent of the synthetic resin solution, the connected core members can be cut at the projecting portions in the second step.

BRIEF DESCRIPTION OF THE DRAWINGS

FIG. 6A illustrates a plan view and FIG. 6B illustrates a rear view of a fastener element (Example).

FIG. 7 is a side view illustrating an embodiment of a processing step of forming an overlay material on a fastener tape (Example).

MODE(S) FOR CARRYING OUT THE INVENTION

Hereinafter, modes for carrying out the invention will be described in detail with reference to the drawings. The invention is not limited to the embodiments described below, and various changes can be made as long as substantially the same configuration and the same function and effect as the invention are implemented.

In the following description, a forward-backward direction indicates a length direction of a fastener tape and is the same direction as a sliding direction along which a slider slides. Moreover, a horizontal direction indicates a tape-width direction of a fastener tape and indicates a direction that is parallel to a tape surface of the fastener tape and orthogonal to a tape-length direction. Further, a front-rear thickness direction indicates a tape front-rear direction orthogonal to the tape surface of the fastener tape and is also referred to simply as a front-rear direction or a thickness direction for the sake of simplicity.

EXAMPLES

Figure 1:
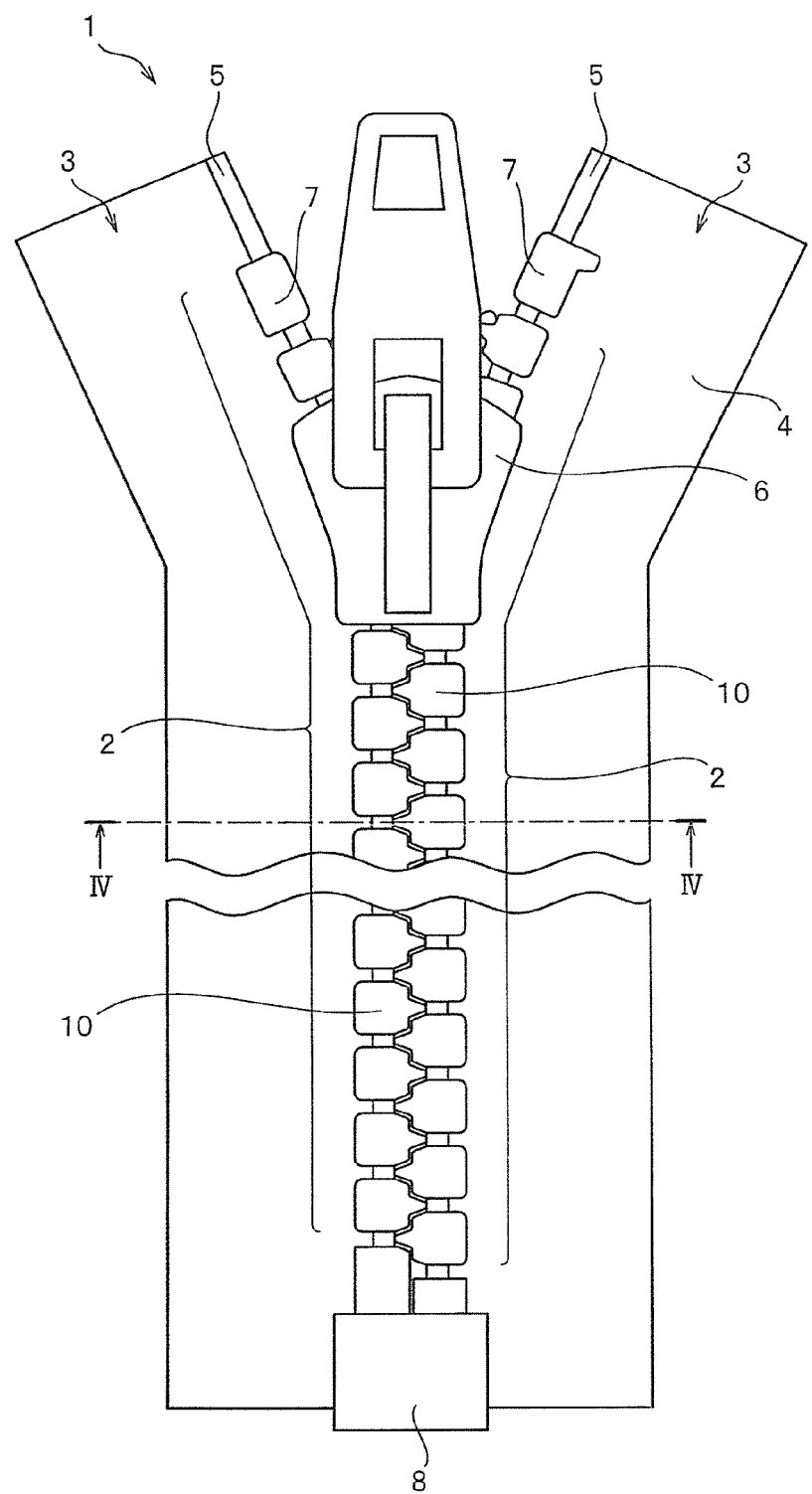
FIG. 1 is a plan view of a slide fastener (Example).

As illustrated in FIG. 1, a slide fastener 1 according to the invention includes a pair of left and right fastener tapes 3, fastener elements 10 arranged at an equal interval along a side edge of each of the fastener tapes 3, a fastener element row 2 that includes a plurality of fastener elements 10, a slider 6 that is slid to engage and disengage the pair of fastener element rows 2, a top stop 7 that restricts sliding of the slider 6 toward an upper end side, and a bottom stop 8 that restricts sliding of the slider 6 toward a lower end side.

In the illustrated example, although the lower ends of the pair of left and right fastener tapes 3 are connected and fixed by the bottom stop 8, a separable bottom end stop that includes an insert pin and a box pin may be used as the bottom stop 8. Further, although a configuration of a single-side open-type slide fastener in which a separable bottom end stop is used at only one of both ends of the fastener element row 2 is described as the slide fastener 1, the slide fastener according to the invention can be suitably applied to a both-side open-type slide fastener or the like in which a separable bottom end stop is used at both ends of the fastener element row 2.

Figure 2:
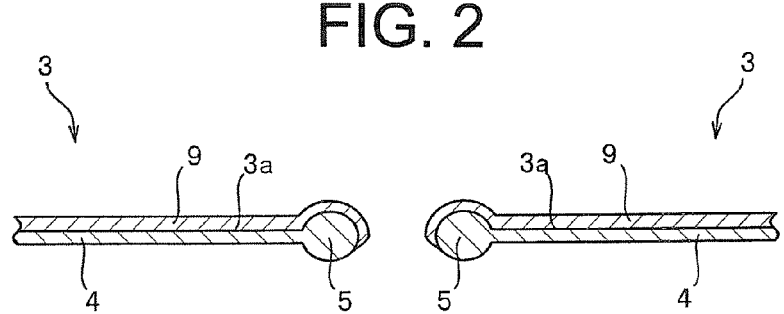
FIG. 2 is a cross-sectional view of a fastener tape (Example).

Each fastener tape 3 includes a tape member 4 and a core member 5 that is larger than the tape member 4 and is formed along a side edge of the tape member 4. As illustrated in FIG. 2, an overlay material 9 that has liquid-tightness and has such a thickness that the overlay material 9 can be elastically deformed is formed on a front surface of the tape member 4 and a surface of the core member 5 that is continuous to the front surface of the tape member 4.

Liquid-tightness means a property that prevents liquid such as water or oil from penetrating from one surface side to the other surface side. It is preferable that the overlay material 9 be formed on the fastener tape 3 in a layered form, and the thickness of the overlay material 9 be the same as or smaller than the tape member 4 since it is possible to form the fastener tape 3 in which elastic deformation is likely to occur and of which flexibility is improved.

Figure 3:
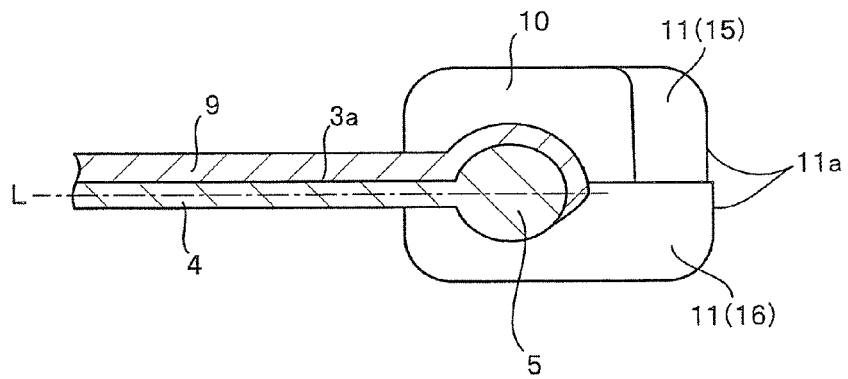
FIG. 3 is a cross-sectional view of a fastener tape and a fastener element (Example).

As illustrated in FIG. 3 in which the fastener element 10 is provided on the fastener tape 3, the overlay material 9 formed on the surface of the core member 5 extends toward a rear surface side beyond a centerline L in the front-rear thickness direction of the tape member 4, and the overlay material 9 is not formed on a portion of the core member 5 or the rear surface side of the tape member 4.

Figure 4:
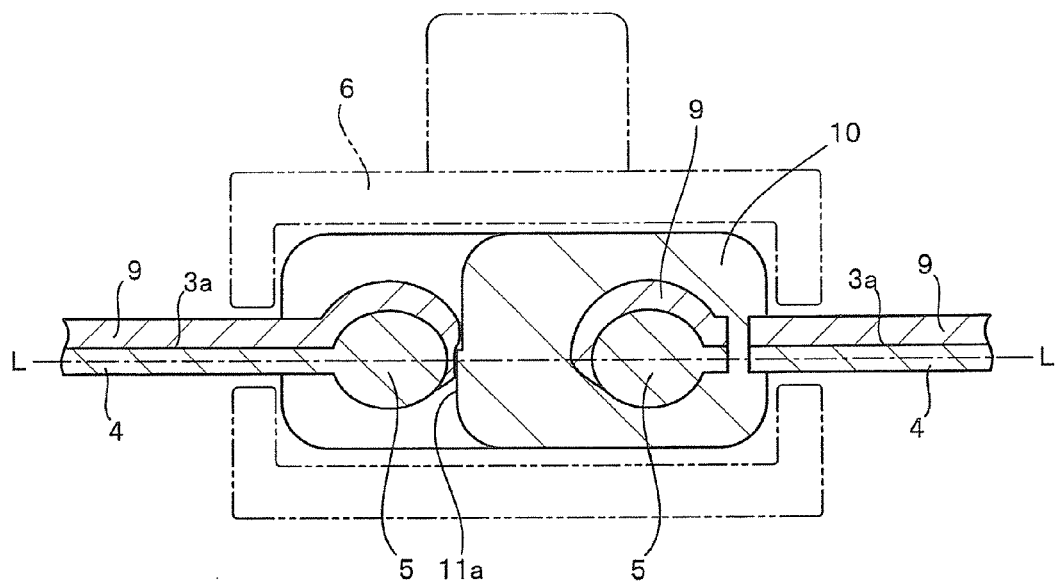
FIG. 4 is a cross-sectional view along line IV-IV in FIG. 1 (Example).

As illustrated in FIGS. 1 and 4, when the pair of fastener element rows 2 engages with each other according to sliding of the slider 6, a tip 11a of an intermeshing head 11 of the fastener element 10 that forms the fastener element row 2 comes into contact with the overlay material 9 which is a side edge of each of the opposing fastener tapes 3 and presses the overlay material 9. In this case, the overlay material 9 is disposed between the core member 5 and the intermeshing head 11.

The tip 11a of the intermeshing head 11 is a portion that is disposed on a side opposite to the body portion 14 in the width direction of the fastener tape 3 and is a side that faces the opposing fastener element rows 2. When the pair of fastener element rows 2 engages with each other, the tip 11a of the intermeshing head 11 comes into contact with the overlay material 9. In order to maintain this contact state, the overlay material 9 needs to be formed also at a position where engagement is realized by a fastening portion 16 described later.

Thus, as illustrated in FIG. 3, the overlay material 9 is formed at a boundary between the fastening portion 16 and the sealing portion 15 of the intermeshing head 11 so as to be formed to extend toward the fastening portion 16 more than the sealing portion 15, and the centerline L in the front-rear thickness direction of the tape member 4 is located closer to the rear surface side than the boundary.

Since the tip 11a of the intermeshing head 11 presses the overlay material 9 formed on the core member 5, the end portion of the overlay material 9 covers the surface of the core member 5 up to a position beyond the centerline L in the front-rear thickness direction of the tape member 4.

The overlay material 9 covering the surface of the core member 5 is pressed by the tip 11a of the intermeshing head 11, whereby a thick portion of the overlay material 9 is compressively deformed. As a result, it is possible to create a liquid-tight state between the intermeshing head 11 and the core member 5.

Figure 5:
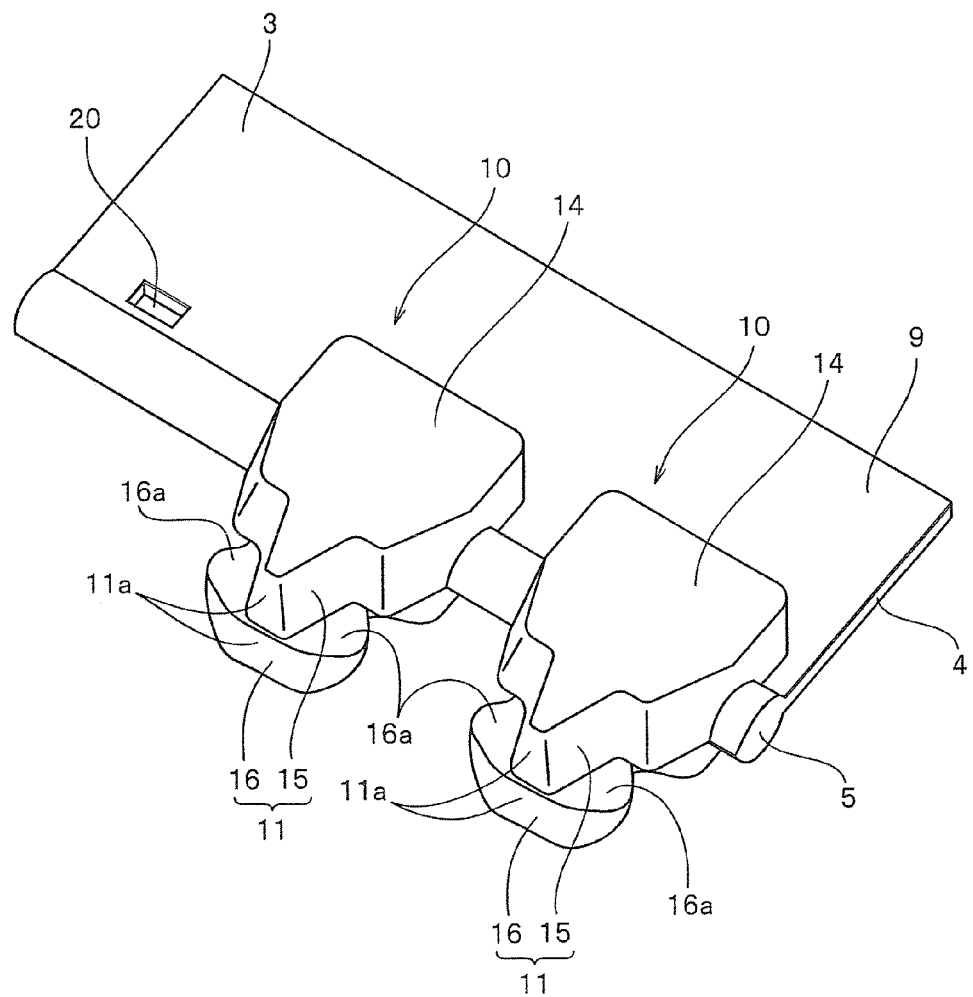
FIG. 5 is a perspective view of a portion of a fastener stringer (Example).

As illustrated in FIG. 5, a hole portion 20 that penetrates through the front and rear surfaces is formed in the tape member 4 on which the overlay material 9 is formed, the fastener element 10 is formed, by injection molding, over both the front and rear surfaces of the tape member 4 and the core member 5, whereby a fastener stringer is obtained. The fastener element 10 formed on both the front and rear surfaces of the tape member 4 and the core member 5 is configured such that a fastener element on the front surface side in a region outer than the hole portion 20 and the core member 5 is integrated with a fastener element on the rear surface side. Moreover, the fastener element on the front surface side and the fastener element on the rear surface side form the fastener element 10.

Figure 6A:
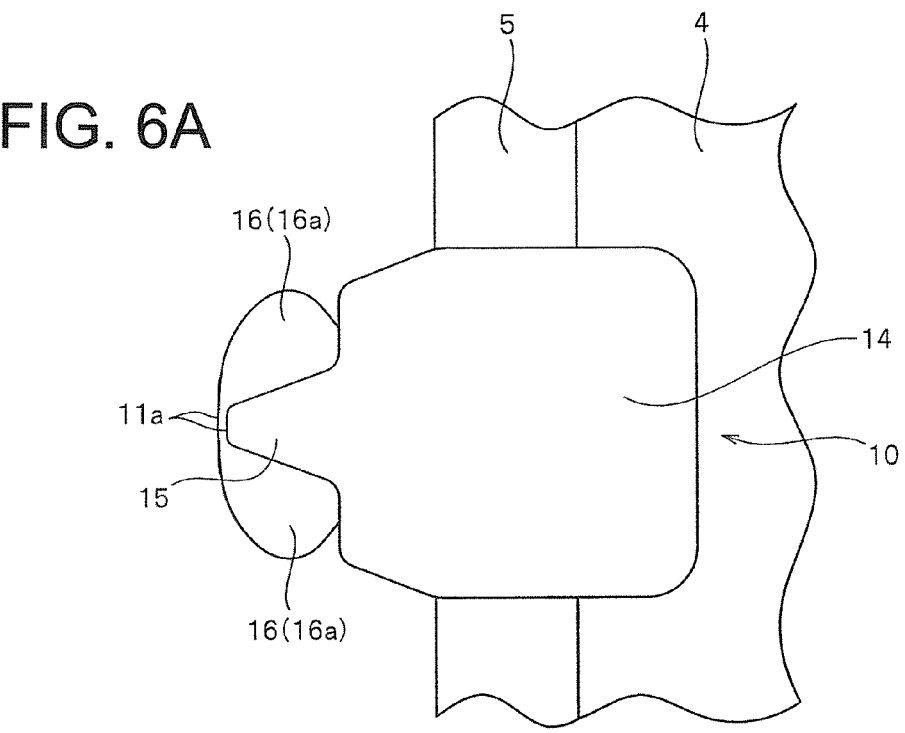
FIG. 6A and FIG. 6B, are collectively referred to herein as FIG. 6.
Figure 6B:
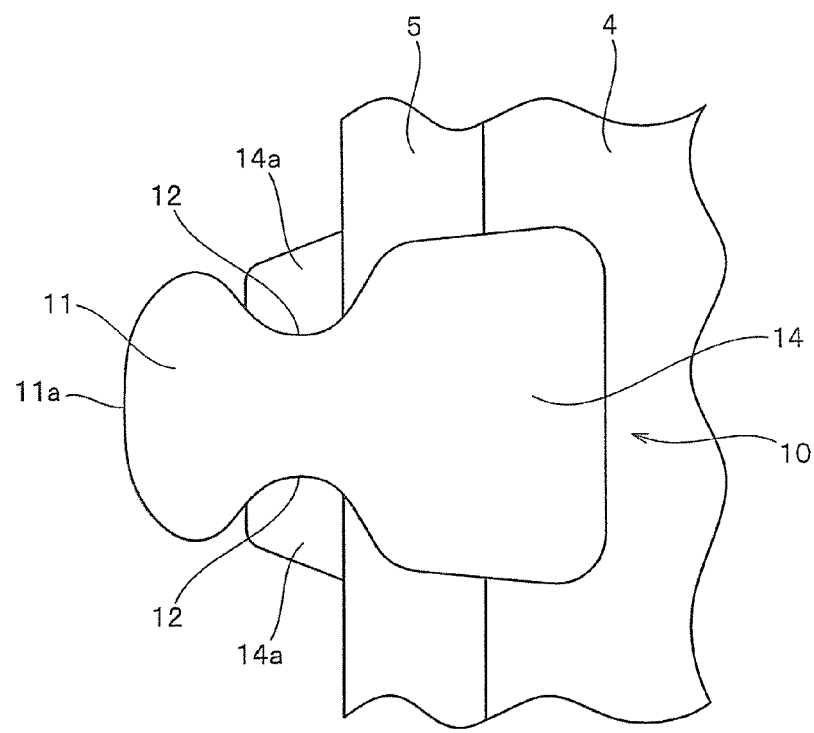

In order to provide liquid-tightness between the engaged fastener element rows 2, the fastener element 10 on the front surface side of the fastener tape 3 has a plan-view shape as illustrated in FIG. 6A. Moreover, in order to maintain the engaged state between the fastener element rows 2, the fastener element 10 on the rear surface side of the fastener tape 3 has a rear-view shape as illustrated in FIG. 6B.

That is, in FIG. 6A, in order to prevent entrance of liquid (for example, water) from the space between the engaged fastener element rows 2, the sealing portion 15 is formed as a projection that has an approximately triangular shape in a plan view. The sealing portion 15 is formed as the intermeshing head 11 on the front surface side of the fastener tape 3 and is continuous to the body portion 14.

As illustrated in FIG. 1, when the pair of fastener element rows 2 engages with each other, the sealing portions 15 of the opposing fastener elements 10 make contact with each other, and a tight-contact state between the contacting fastener elements 10 can be maintained.

Moreover, since the tip 11a of the intermeshing head 11 can press the overlay material 9 formed on the core member 5, it is possible to prevent entrance of liquid from the space between the pair of fastener element rows 2.

The shape of the sealing portion 15 is not limited to the shape illustrated in the figure, but an appropriate shape can be employed as long as the shape can prevent entrance of liquid from the space between the engaged fastener element rows 2. In particular, the fastener element 10 of which the top and rear-view shapes are different is appropriate, and the sealing portion 15 preferably has such a shape that the dimension gradually decreases in the length direction of the fastener tape 3 as it advances from the body portion 14 toward the counterpart fastener tape 3 in the width direction of the fastener tape 3.

Thus, the shape of the sealing portion 15 is not limited to a triangular shape, and the sealing portion 15 may be formed as a projection having such a shape that a flat surface larger than a triangular shape is provided at the tip, for example, an approximately trapezoidal shape in a plan view.

In FIG. 6B, a shape in which the engaged state between the fastener element rows 2 is maintained is illustrated as the shape of the intermeshing head 11 on the rear surface side of the fastener tape 3. That is, the fastening portion 16 having a pair of left and right fastening surfaces 16a is configured as the shape of the intermeshing head 11 on the rear surface side of the fastener tape 3. The fastening portion 16 is configured as the intermeshing head 11 on the rear surface side of the fastener tape 3.

In other words, the intermeshing head 11 extends from the body portion 14 toward the counterpart fastener element row 2, the intermeshing head 11 and the body portion 14 are connected by a neck portion 12, and the intermeshing head 11 is located on the outer side of the fastener tape 3.

The intermeshing head 11 and the body portion 14 extended from the intermeshing head 11 are connected by the narrowed neck portion 12. The dimension of the neck portion 12 in the length direction of the fastener tape 3 is smaller than that of the intermeshing head 11 and the body portion 14. The body portion 14 and the intermeshing head 11 are formed, by injection molding, on the tape member 4 and the overlay material 9 of the fastener tape 3, whereby the fastener element 10 is attached to the fastener tape 3.

When the pair of fastener element rows 2 engages with each other, the fastening portion 16 can be engaged between the narrowed neck portions 12 of the adjacent opposing fastener elements 10. Moreover, the respective fastening surfaces 16a can come into contact with shoulder portions 14a on the rear surface side of the body portions 14 of the adjacent opposing fastener elements 10. As a result, it is possible to maintain the engaged state between the fastener element rows 2 that are in the engaged state.

Although a configuration in which the sealing portion 15 is formed is described as a configuration for preventing entrance of liquid from the space between the engaged fastener element rows 2, the sealing portion 15 may not be provided when the fastening portion 16 has a function of preventing entrance of liquid.

A synthetic resin film made from a flexible, elastic, and compressively deformable material such as polyurethane, polyester, polypropylene, nylon, polyvinyl chloride, or silicone rubber, a synthetic resin solution, and the like can be used as the overlay material 9. When a synthetic resin film that has liquid-tightness and has such a thickness that the synthetic resin film can be elastically deformed is used, the overlay material 9 can be attached to the front surface side of the fastener tape 3. When a synthetic resin solution is used, the overlay material 9 can be applied to the front surface side of the fastener tape 3 to a desired thickness.

Figure 10:
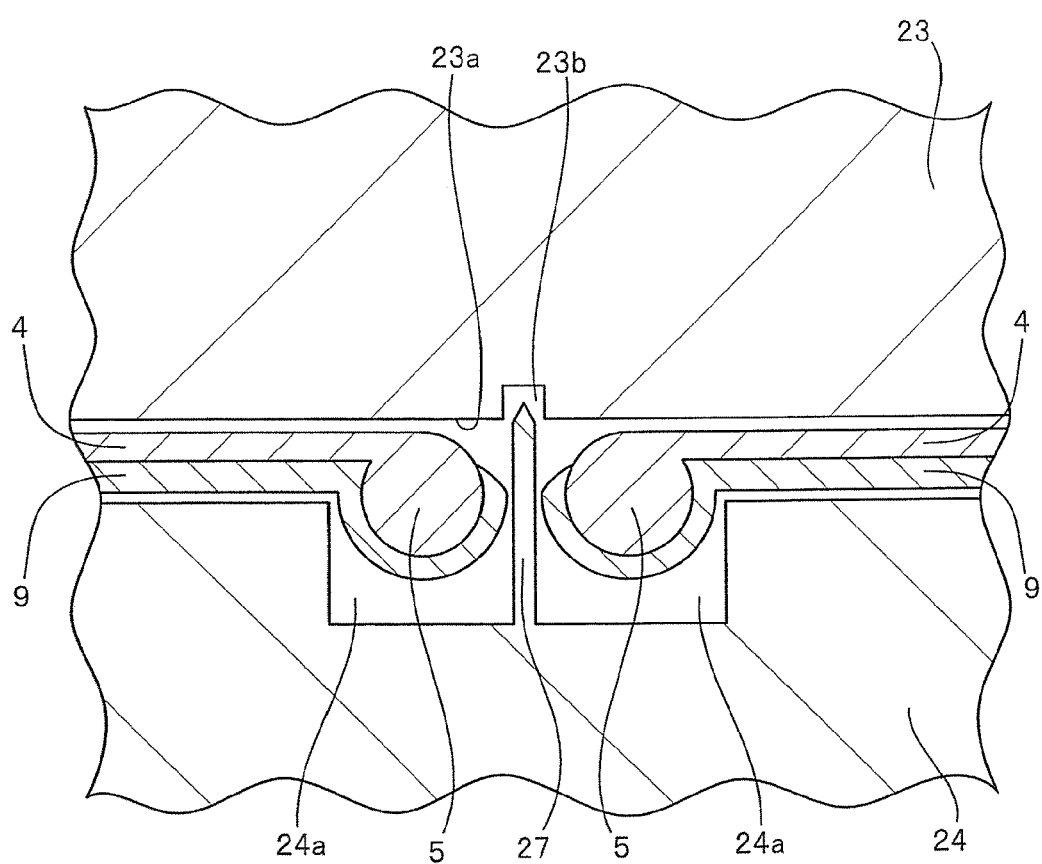
FIG. 10 is an enlarged cross-sectional view of a main part of the second step (Example).
Figure 11:
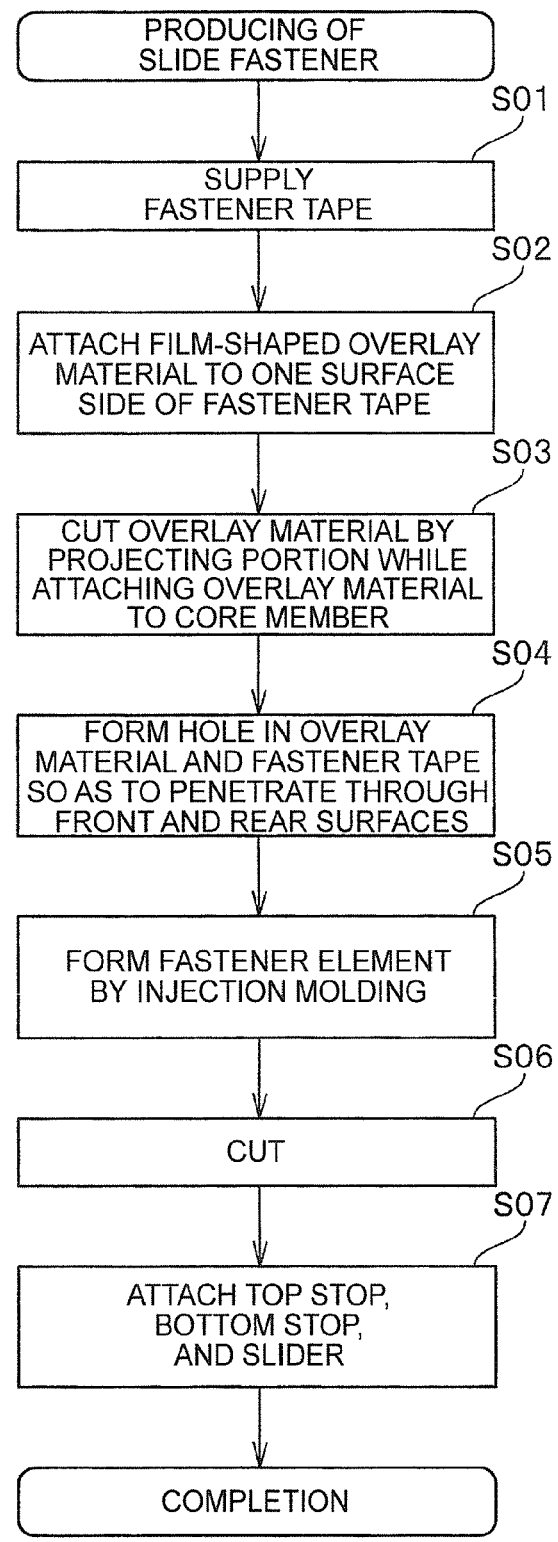
FIG. 11 is a process chart of a processing step of forming an overlay material on a fastener tape (Example).

Next, a method of producing the slide fastener 1 will be described with reference to FIGS. 7 to 11. FIG. 11 is a process chart illustrating a first embodiment of a method of producing the slide fastener 1. In step S01 illustrated in FIG. 11, control of a supply step of a first step is performed. As illustrated in FIG. 7, a pair of fastener tapes 3 in which the core member 5 is disposed at an edge of the tape member 4 is supplied between first and second rollers 21 and 22. At the same time, a synthetic resin film 17 in which a release paper 17a is formed on a rear surface side which is a side that is in contact with the second roller 22 is supplied between the first and second rollers 21 and 22. The synthetic resin film 17 is configured as the overlay material 9.

The first roller 21 is disposed on a side (the rear surface side of the fastener tape 3) opposite to the surface of the fastener tape 3 to which the synthetic resin film 17 is attached, and the second roller 22 is disposed on the front surface side of the fastener tape 3.

Figure 8:
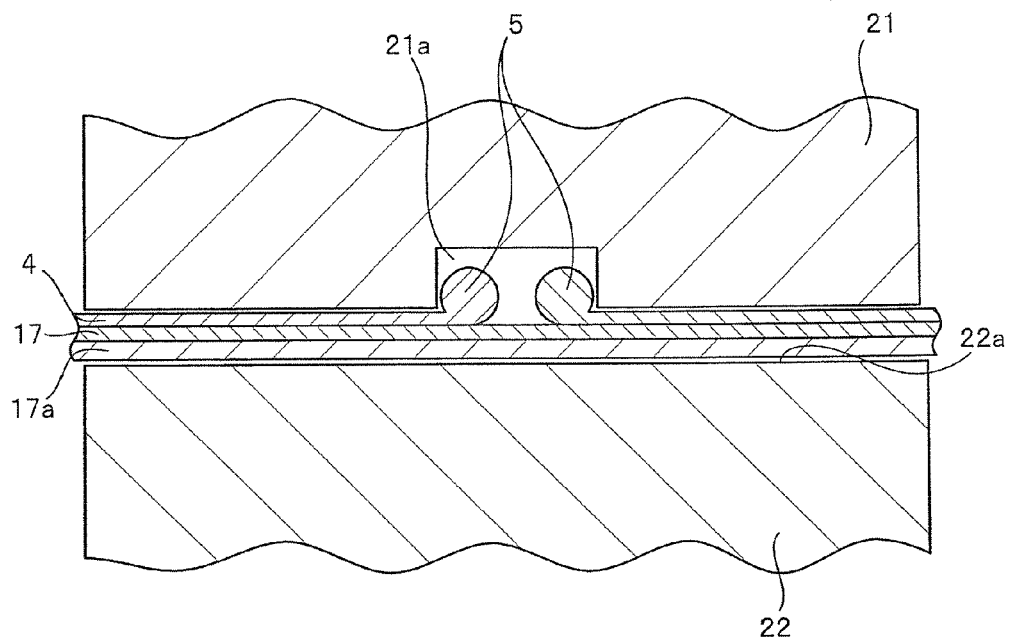
FIG. 8 is a cross-sectional view illustrating a first step (Example).

In step S02, control of a forming step of the first step is performed. The synthetic resin film 17 and the pair of fastener tapes 3 that is arranged in parallel so as to face the core member 5 are supplied between the first and second rollers 21 and 22, whereby the synthetic resin film 17 is attached to a front surface 3a of the pair of fastener tapes 3. In this case, as illustrated in FIG. 8, a loop-shaped first recess 21a, in which the pair of core members 5 that is separated so as to face each other is received, is formed on an outer circumferential surface of the first roller 21. Further, the outer circumferential surface of the second roller 22 disposed so as to face the first roller 21 is formed in a cylindrical surface shape as a first flat surface 22a.

Due to the first flat surface 22a of the second roller 22, it is possible to tilt the pair of core members 5 so as to be received in the first recess 21a, and to press the synthetic resin film 17 to be attached to the front surface 3a of the pair of fastener tapes 3. The release paper 17a formed on the synthetic resin film 17 has a function of preventing the synthetic resin film 17 from being attached to the outer circumferential surface of the second roller 22 and the synthetic resin film 17 from slipping between the release paper 17a and the second roller 22, and allowing the pair of fastener tapes 3 and the synthetic resin film 17 to be synchronized and conveyed.

As illustrated in FIG. 7, the release paper 17a is separated from the synthetic resin film 17 with the aid of a separation roller 29, and the separated release paper 17a is wound around with a release paper winding roller 25. The synthetic resin film 17 with the release paper 17a separated and the pair of fastener tapes 3 are conveyed to be located between third and fourth rollers 23 and 24.

The third roller 23 is disposed on the rear surface side of the fastener tape 3 same as the first roller 21 with respect to the fastener tape 3. Moreover, the fourth roller 24 is disposed on the front surface side of the fastener tape 3 same as the second roller 22 and the release paper winding roller 25.

Figure 9:
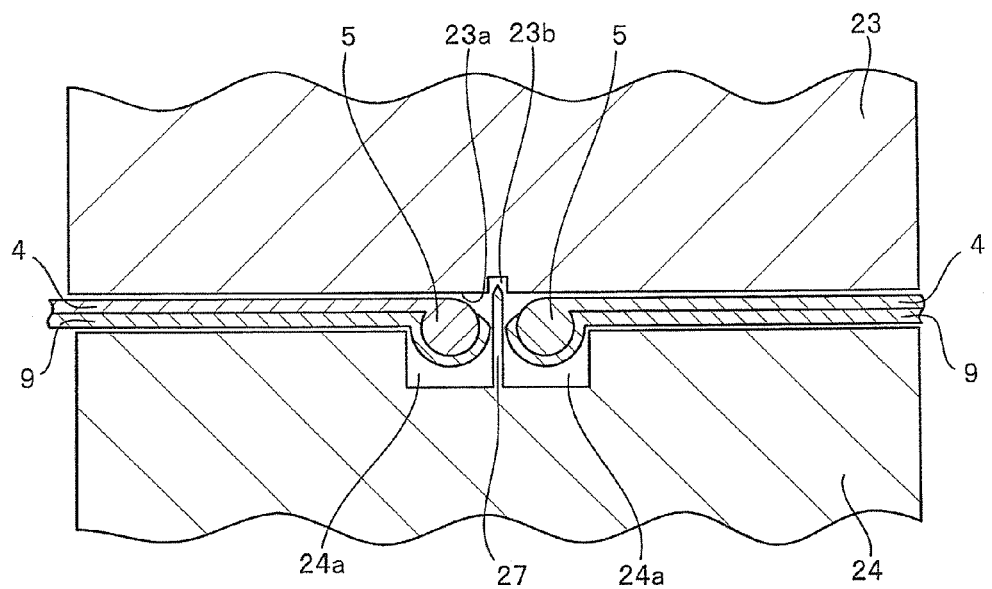
FIG. 9 is a cross-sectional view illustrating a second step (Example).

In step S03, as illustrated in FIG. 9, the synthetic resin film 17 disposed between the pair of core members 5 is cut by a projecting portion 27 that is formed on an outer circumferential surface of the fourth roller 24, and the cut synthetic resin film 17 is attached to the core members 5. The position of an end portion of the synthetic resin film 17 attached to the core member 5 is located closer to the centerline L in the front-rear thickness direction of the tape member 4 than an apex on the rear surface side of the core member 5.

The apex on the rear surface side of the core member 5 is a position at which the dimension in the front-rear thickness direction of the core member 5 on a rear surface side (other surface side) opposite to the front surface side (one surface side) of the fastener tape 3 to which the synthetic resin film 17 is attached reaches its maximum. The apex may be an intersection between an outer circumferential edge of the core member 5 and a virtual line that extends in the front-rear thickness direction while passing through the center of the core member 5 in a cross-sectional view.

The fastener tape 3 and the synthetic resin film 17 that are conveyed between the third and fourth rollers 23 and 24 are cut by the projecting portion 27 that is formed on the fourth roller 24. In this case, the synthetic resin film 17 is cut while the synthetic resin film 17 is stretched from the front surface side of the fastener tape 3 toward the rear surface side. Thus, the synthetic resin film 17 can be attached so as to be wound around the core member 5.

The position of the end portion of the synthetic resin film 17 can be adjusted by adjusting a width of the first recess 21a formed in the first roller 21, a width of a second recess 24a formed in the fourth roller 24, a gap between the first roller 21 and the second roller 22, and a gap between the third roller 23 and the fourth roller 24, respectively.

As illustrated in FIG. 9, the loop-shaped second recess 24a, in which the synthetic resin film 17 and the pair of core members 5 that is separated so as to face each other are received, is formed on the outer circumferential surface of the fourth roller 24, and the disk-shaped projecting portion 27 is formed on a bottom portion of the second recess 24a. The position of the tip of the projecting portion 27 is set to such a position that the tip can be inserted further toward the rear surface of the fastener tape 3 than the centerline L in the front-rear thickness direction of the fastener tape 3 and the tip can be inserted between the pair of opposing core members 5.

Due to the tip of the projecting portion 27, the synthetic resin film 17 can be cut. Due to the circumferential surface of the projecting portion 27, the cut synthetic resin film 17 can be attached to the core member 5. Further, the outer circumferential surface of the third roller 23 that is disposed so as to face the fourth roller 24 is formed in a cylindrical surface shape as the second flat surface 23a. Due to the second flat surface 23a, the pair of core members 5 can be tilted so as to be received in the second recess 24a. Moreover, as illustrated in FIG. 10, a loop-shaped groove 23b in which the tip of the projecting portion 27 is received is formed in the second flat surface 23a.

In step S04, the hole portion 20 that penetrates through the front and rear surfaces is formed in the synthetic resin film 17 and the tape member 4 using a drilling machine (not illustrated). The hole portion 20 is used as a hole for connecting the fastener element on the front surface side of the fastener tape 3 and the fastener element on the rear surface side during injection molding of the fastener elements 10 performed in the next step S05.

In step S05, the fastener elements 10 which are fastener elements are formed, by injection molding, on both the front and rear surfaces of the fastener tape 3. As illustrated in FIGS. 6A and 6B, the fastener elements 10 are molded so as to provide liquid-tightness between the engaged fastener element rows 2 and maintain the engaged state between the fastener element rows 2.

The fastener elements that are molded on both the front and rear surfaces of the fastener tape 3 are integrally bonded in a region located on the outer side more than the hole portion 20 and the core member 5, whereby the fastener elements 10 are obtained.

Although FIG. 7 illustrates a configuration necessary for creating a state where the fastener tape 3, to which the synthetic resin film 17 is attached, is wound around the winding roller 26, additional configurations such as a drilling machine for drilling the hole portion 20, an injection molding apparatus, and the like may be arranged on a conveying path after the synthetic resin film 17 is cut by the projecting portion 27. By configuring in this manner, it is possible to form a fastener chain by a series of continuous operations.

In step S06, the fastener chain in which the fastener element rows 2 are formed is cut into a desired length dimension. As the step of cutting the fastener chain into a desired length dimension, the fastener chain may be cut into a desired length dimension after the top stop 7, the bottom stop 8, and the slider 6 are attached to the fastener chain.

In step S07, the top stop 7, the bottom stop 8, and the slider 6 are attached to the fastener chain that is cut into a desired length dimension in step S06.

In this way, it is possible to produce the slide fastener 1 according to the invention.

Figure 12:
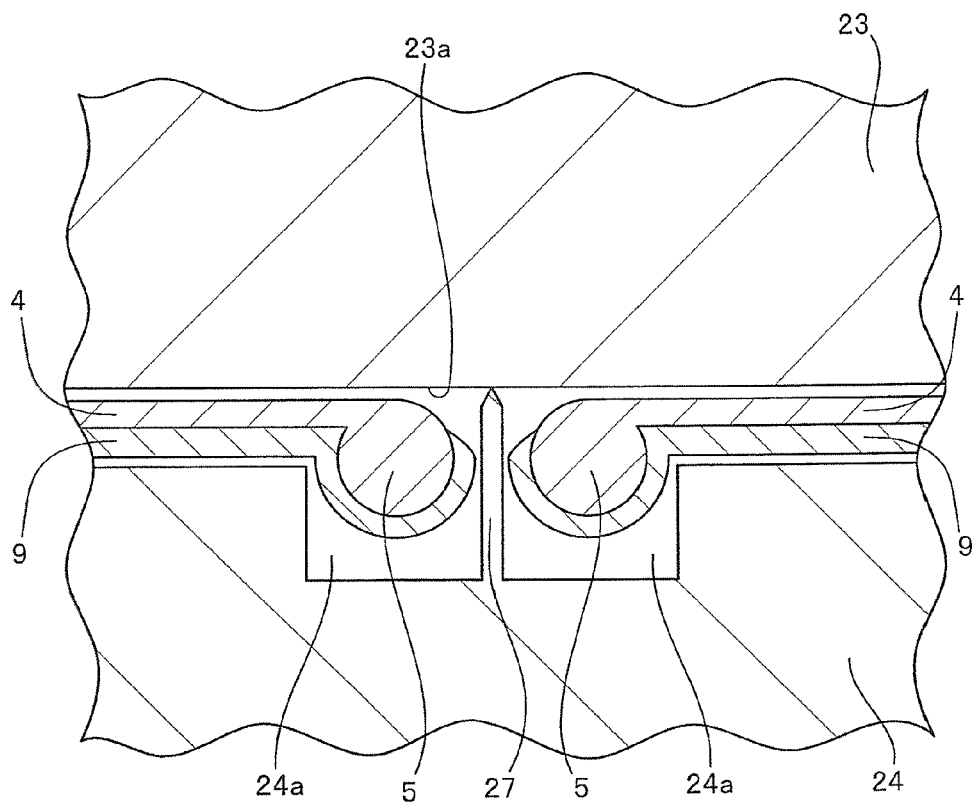
FIG. 12 is a cross-sectional view illustrating a modification example of the second step (Example).

FIGS. 9 and 10 illustrate a configuration in which the loop-shaped groove 23b, in which the tip of the projecting portion 27 formed on the fourth roller 24 is received, is formed in the second flat surface 23a of the third roller 23. However, as illustrated in FIG. 12, the third roller 23 may be configured in which the loop-shaped groove 23b is not formed and the formed second flat surface 23a is kept. In this case, the position of the tip of the projecting portion 27 is located closer to the rear surface side beyond the center in the front-rear direction of the fastener tape 3.

Figure 13:
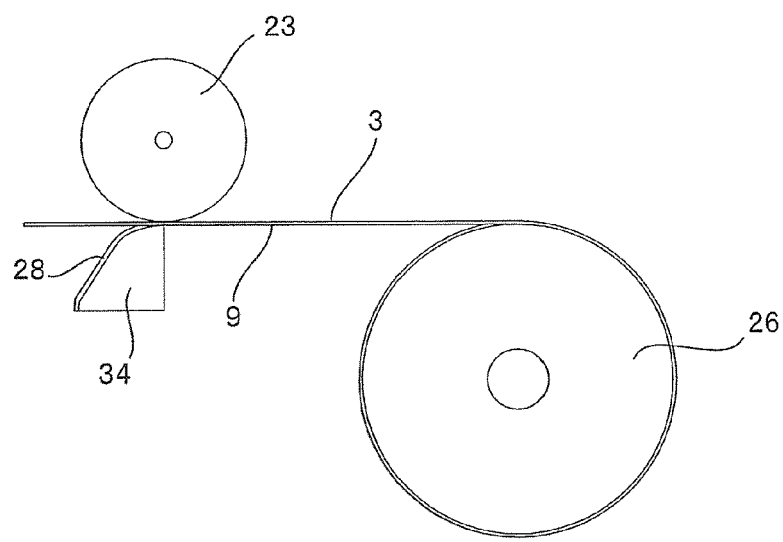
FIG. 13 is a side view illustrating another modification example of the second step (Example).

Moreover, although a configuration in which the projecting portion 27 is formed on the fourth roller 24 has been described, a fixing member 34 in which a recess for receiving the pair of core members 5 and the synthetic resin film 17 and a projecting portion 28 formed on the inner surface of the recess are formed may be used instead of the fourth roller 24 as illustrated in FIG. 13.

In the description of the producing step, a configuration in which the synthetic resin film 17 is used as the overlay material 9 has been described. The overlay material 9 is not limited to the synthetic resin film 17, and a synthetic resin solution 30 may be applied to the front surface of the fastener tape 3.

A producing step of applying the synthetic resin solution 30 to the front surface of the fastener tape 3 to a desired thickness will be described with reference to FIG. 14. In the producing step of FIG. 14, a step of applying the synthetic resin solution 30 to the front surface of the fastener tape 3 is illustrated, which is different from the configuration of using the synthetic resin film 17 illustrated in FIG. 7. The other configurations are the same as the configurations illustrated in FIG. 7. Thus, the same configurations as the configurations illustrated in FIG. 7 will be denoted by the same reference numerals as used in FIG. 7, and the description of such reference will not be provided.

Figure 14:
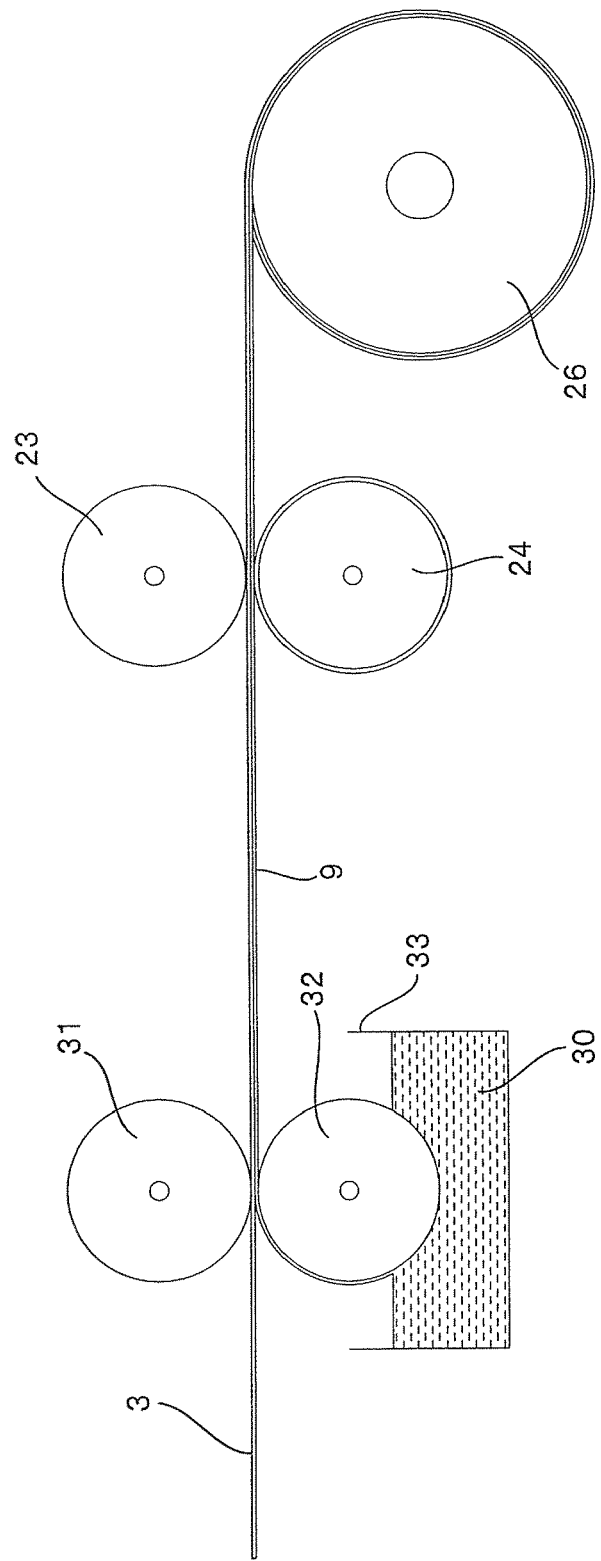
FIG. 14 is a side view illustrating another embodiment of a processing step of forming an overlay material on a fastener tape (Example).
Figure 15:
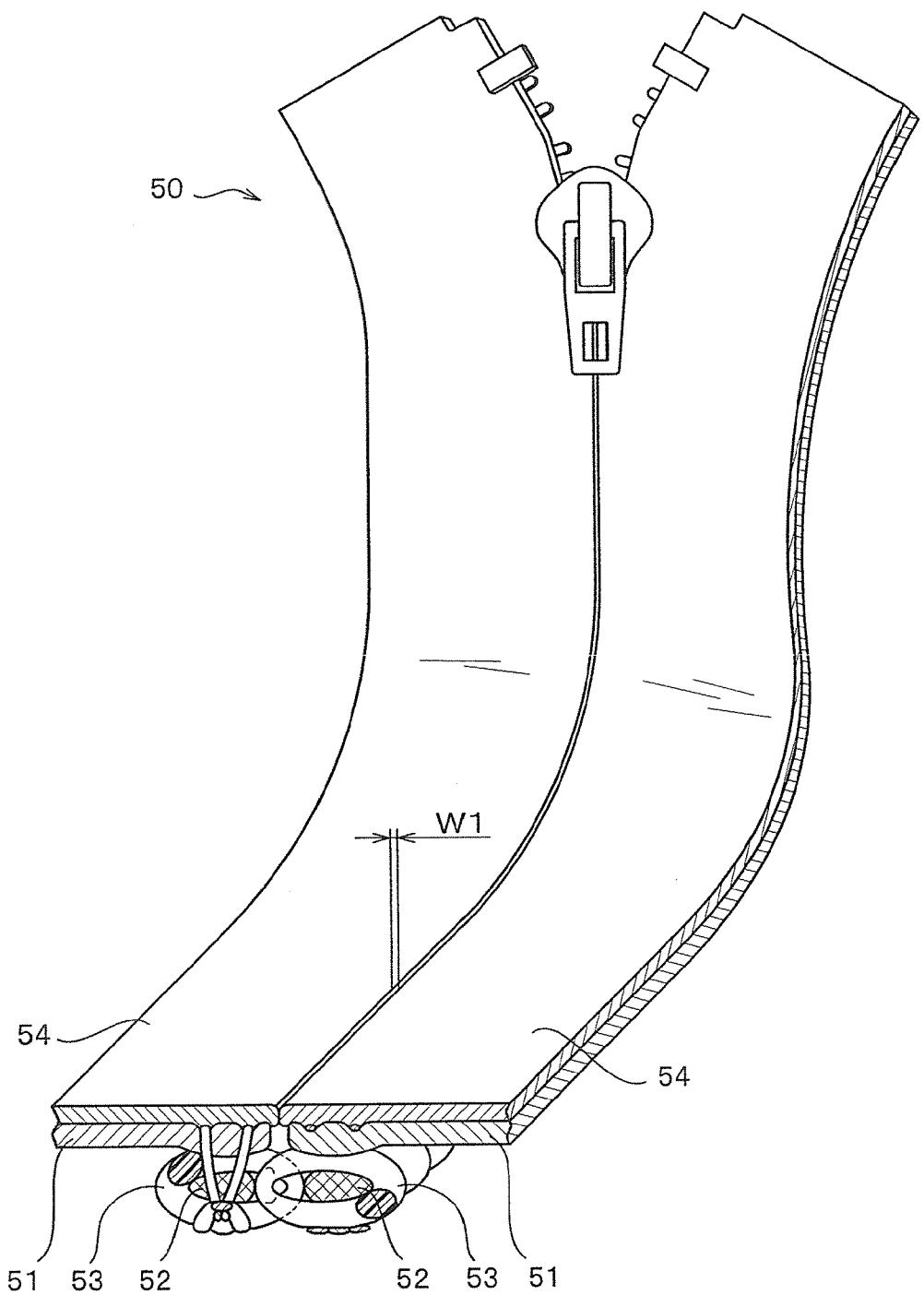
FIG. 15 is a perspective view illustrating a main part of a liquid-tight slide fastener (First Conventional Example)
Figure 16:
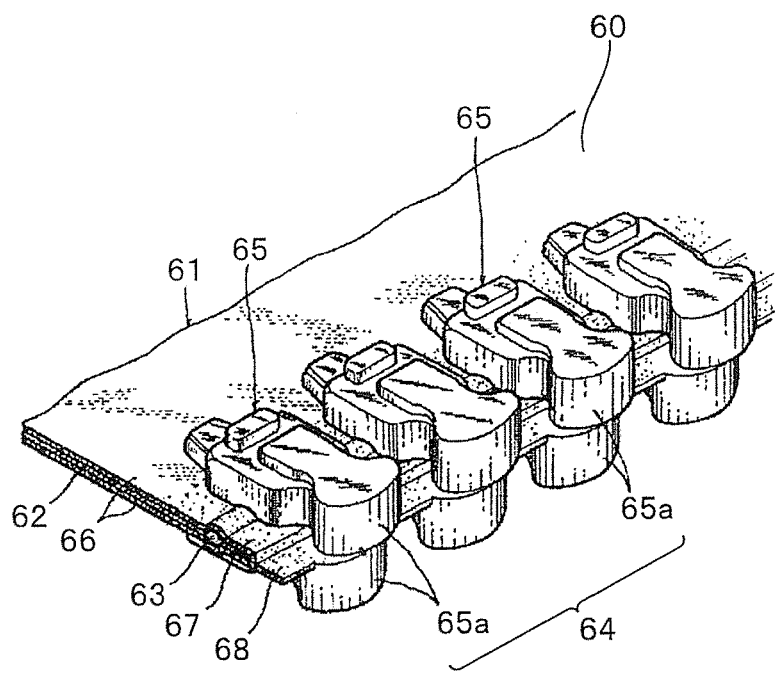
FIG. 16 is a perspective view illustrating a main part of a fastener stringer (Second Conventional Example).

As illustrated in FIG. 14, a pair of fastener tapes 3 is supplied between fifth and sixth rollers 31 and 32. In this case, the same loop-shaped recess as that formed on the outer circumferential surface of the first roller 21 is formed on the outer circumferential surface of the fifth roller 31. Moreover, a pair of core members 5 that is separated so as to face each other is received in the loop-shaped recess that is formed on the outer circumferential surface of the fifth roller 31.

The outer circumferential surface of the sixth roller 32 is configured in a flat cylindrical surface shape, and a portion of the sixth roller 32 is immersed in the synthetic resin solution 30 in a synthetic resin tank 33. By rotating the sixth roller 32 illustrated in FIG. 14 in a clockwise direction, it is possible to apply the synthetic resin solution 30 attached to the cylindrical surface of the sixth roller 32 on the front surface of the pair of fastener tapes 3 to a desired thickness and to form the overlay material 9.

The pair of fastener tapes 3 to which the synthetic resin solution 30 is applied is conveyed to the space between the third and fourth rollers 23 and 24 after the applied synthetic resin solution 30 is dried, the overlay material 9 between the core members 5 is cut, and the cut overlay material 9 is attached to the core members 5. Further, the fixing member 34 illustrated in FIG. 13 may be used instead of using the fourth roller 24.

When dried, the synthetic resin solution 30 exhibits liquid-tightness and becomes the overlay material 9 that can be elastically deformed.

In the above description, although a configuration in which the overlay material 9 is formed on the front surface of the fastener tape 3 has been described, the overlay material 9 may be formed on the rear surface of the fastener tape 3 and may not be formed on the front surface of the tape member 4. In this case, the end portion of the overlay material 9 formed on the core member 5 may be formed beyond the centerline of the tape member 4. Moreover, a water-repellent agent and an oil-repellent agent may be applied so as to further improve liquid-tightness.

INDUSTRIAL APPLICABILITY

The invention can be suitably used as a slide fastener that is attached to openings of bags, clothes, and the like which require water-repellent properties and oil-repellent properties.

DESCRIPTION OF REFERENCE NUMERALS

1: SLIDE FASTENER
2: FASTENER ELEMENT ROW
3: FASTENER TAPE
3a: FRONT SURFACE
4: TAPE MEMBER

5: CORE MEMBER
9: OVERLAY MATERIAL
10: FASTENER ELEMENT
11: INTERMESHING HEAD
11a: TIP
17: SYNTHETIC RESIN FILM
21: FIRST ROLLER
21a: FIRST RECESS
22: SECOND ROLLER
22a: FIRST FLAT SURFACE
23: THIRD ROLLER
23a: SECOND FLAT SURFACE
23b: GROOVE (FOR PROJECTING PORTION)
24: FOURTH ROLLER
24a: SECOND RECESS
25: RELEASE PAPER WINDING ROLLER
26: WINDING ROLLER
27: PROJECTING PORTION
28: PROJECTING PORTION
30: SYNTHETIC RESIN SOLUTION
31: FIFTH ROLLER
32: SIXTH ROLLER
33: SYNTHETIC RESIN TANK
34: FIXING MEMBER
50: LIQUID-TIGHT SLIDE FASTENER
51: FASTENER TAPE
52: CORE THREAD
53: COUPLING ELEMENT ROW
54: LIQUID-TIGHT LAYER
60: FASTENER STRINGER
61: FASTENER TAPE
62: CORE TAPE
63: PROJECTING PIECE
64: ELEMENT ROW
65: ELEMENT TOOTH
65a: INTERMESHING HEAD
66: OVERLAY LAYER
67: EXTENSION PORTION
68: FLANGE
L: CENTERLINE
W1: GAP

The invention claimed is:

1. A slide fastener including:
a pair of left and right fastener tapes, each of which includes a tape member and in which a core member that is larger than the tape member is formed along a side edge of the tape member;
a fastener element row in which each of the core members in the pair of left and right fastener tapes face each other and a plurality of fastener elements is arranged at an equal interval along each of the core members; and
a slider that is attached so as to be slidable along the pair of left and right fastener element rows so that the fastener elements disposed to face each other are engaged and disengaged, wherein:
each fastener element includes an intermeshing head and a body portion that extends from the intermeshing head;
an overlay material that has liquid-tightness and is elastically deformable is formed on an entire surface of a first surface of each of the tape members and a first surface of each core member continuous to the first surface of each tape member;
the overlay material formed on the first surface of each core member extends toward an opposite, second surface of each core member beyond a centerline in a front-rear thickness direction of the tape members; and
a tip of each intermeshing head of each fastener element comes into contact with the overlay material on the side edge of the opposing fastener tape when the pair of fastener element rows engage with each other, wherein an end portion of the overlay material formed on each core member is positioned closer to the centerline than an apex of the opposite, second surface of each core member, wherein the apex is on an exposed portion of the core members.

* * * * *